(12) United States Patent
Bell et al.

(10) Patent No.: US 6,457,502 B1
(45) Date of Patent: Oct. 1, 2002

(54) DUAL TIRE PRESSURE BALANCE SYSTEM

(75) Inventors: Douglas W. Bell, Mattoon; David W. Bruce, Decatur; Jon R. Greiner, Dunlap; David R. Hinton, Mt. Zion, all of IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/738,928

(22) Filed: Dec. 15, 2000

(51) Int. Cl.$^7$ .......................... B60C 23/10; B60C 29/00
(52) U.S. Cl. .................. 152/416; 152/415; 152/418
(58) Field of Search ................... 152/415, 416, 152/417, 418, 427, 429

(56) References Cited

U.S. PATENT DOCUMENTS

| | | | |
|---|---|---|---|
| 1,800,780 A | | 4/1931 | Daneel |
| 1,887,715 A | * | 11/1932 | Hester ..................... 152/418 |
| 2,577,458 A | | 12/1951 | Gaiptman |
| 2,634,782 A | | 4/1953 | Turek et al. |
| 2,634,783 A | | 4/1953 | Turek et al. |
| 2,685,906 A | | 8/1954 | Williams |
| 2,693,841 A | | 11/1954 | Webster, Jr. |
| 2,715,430 A | | 8/1955 | Lindeman |
| 2,849,047 A | | 8/1958 | Lamont et al. |
| 2,944,579 A | | 7/1960 | Kamm et al. |
| 2,976,906 A | | 3/1961 | Kamm et al. |
| 3,362,452 A | | 1/1968 | Harnish |
| 3,760,859 A | * | 9/1973 | Shahan et al. ............. 152/415 |
| 4,019,552 A | | 4/1977 | Tsuruta |
| 4,154,279 A | | 5/1979 | Tsuruta |
| 4,313,483 A | | 2/1982 | Brockmann |
| 4,349,064 A | * | 9/1982 | Booth ..................... 152/418 |
| 4,418,737 A | | 12/1983 | Goodell et al. |
| 4,598,750 A | | 7/1986 | Gant |
| 4,865,349 A | | 9/1989 | Church, Jr. |
| 5,054,511 A | | 10/1991 | Tuan et al. |
| 5,540,268 A | * | 7/1996 | Mittal ..................... 152/415 |
| 5,587,698 A | | 12/1996 | Genna |
| 5,807,445 A | * | 9/1998 | Hoffmann ................. 152/415 |
| 6,296,010 B1 | * | 10/2001 | DeLauer .................... 152/415 |
| 6,354,348 B1 | * | 3/2002 | Taillandier ............... 152/342.1 |

FOREIGN PATENT DOCUMENTS

JP 3027041 3/2000

* cited by examiner

Primary Examiner—S. Joseph Morano
Assistant Examiner—Jason R. Bellinger
(74) Attorney, Agent, or Firm—Tom Derry

(57) ABSTRACT

This invention relates to a method and apparatus for maintaining equal air pressure in a pair of tires on a work machine. The invention provides a valve body with a pair of piston chambers. A piston is reciprocatably positioned within each piston chamber, the pistons are biased toward a first closed end of the piston chambers. The closed end of each piston chamber is connected by a passageway to one of the tires. Each piston chamber is additionally fluidly connected to the other piston chamber. When the air pressure in each tire is above a predetermined amount the pistons are moved away from the closed end of the piston chamber and airflow is permitted between the piston chambers thereby balancing the tire pressures. If the pressure in either tire is below the predetermined minimum, the piston in that respective piston chamber moves toward the first end to block, airflow between the piston chambers.

8 Claims, 1 Drawing Sheet

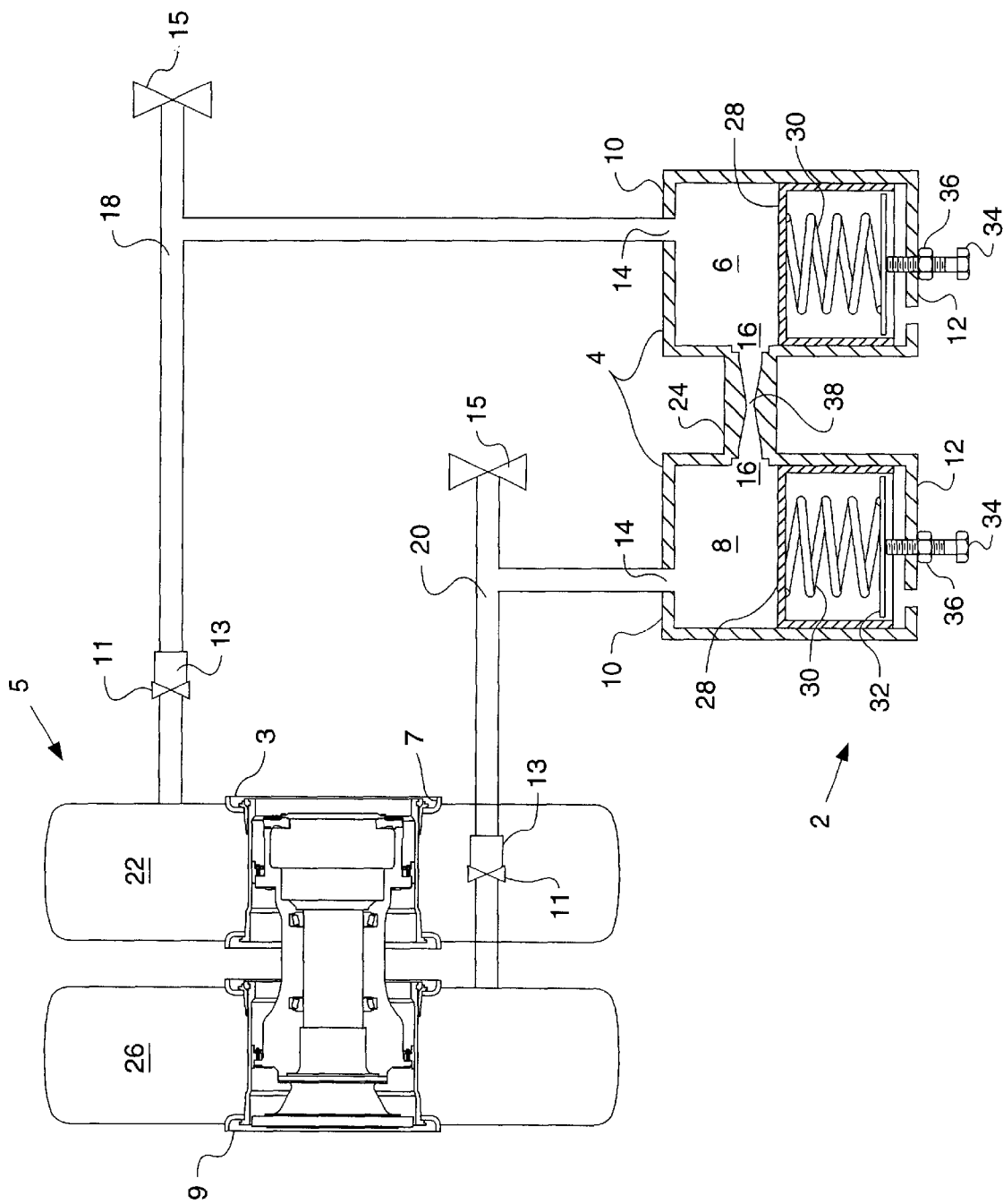

DUAL TIRE PRESSURE BALANCE SYSTEM

TECHNICAL FIELD

This invention relates generally to a pressure balance system between a set of dual tires on a vehicle and more specifically to a valve arrangement for controlling the air pressure between such dual tires.

BACKGROUND ART

Load hauling trucks, earthmoving equipment, and the like often are propelled by sets of dual tires. Machines of this nature typically have a set of dual tires mounted on each end of an axle. Each set of dual tires includes an inner tire and an outer tire, with each tire being mounted on a separate rim. The inner rim and tire are attached to an inboard end of a wheel assembly and the outer rim and tire are attached to an outboard end of the wheel assembly. The wheel assembly rotates about an axle via a pair of wheel bearings. One of the wheel bearings is located near the inboard end of the wheel assembly and the other is located near the outboard end of the wheel assembly. The wheel bearings are designed and positioned on the axle to carry a predetermined portion of the load (gross weight) of the machine, the load is then transferred through the tires to the ground. During normal operation of the machine, the air pressure in the inner and outer tires may not be equal. This can be caused by improper inflation, uneven heating of the tires, or an air leak in either tire.

Unbalanced or improper air pressure between the inner and outer tires can cause a portion of the load on either wheel bearing to shift from one bearing to the other. These unbalanced loads can cause excessive wear on one or each of tire(s) or improper loading on one or each of the wheel bearing(s). Repeated excessive loading may cause permanent damage to the bearing(s).

Each of the tires could be connected together by a hose or tube passageway to allow equalization of air pressure, but a sudden loss of pressure in either tire would result in a loss of pressure in both tires.

This invention is directed to overcome one or more of the problems set forth above.

DISCLOSURE OF THE INVENTION

In one aspect of the present invention, a pressure equalizing valve is provided for equalizing the air pressure between a set of dual tires. The equalizing valve has a pair of piston chambers. Each piston chamber has an inlet port, outlet port, and a piston reciprocatably positioned within its respective piston chamber. The piston is moveable between a first and a second position where the first position closes the outlet port and the second position opens the outlet port. The outlet ports of the piston chambers are connected together to allow passage of air when each piston is in its second position. A biasing arrangement in each piston chamber acts to move its respective piston toward its first position while air pressure at the respective inlet port acts to move the piston toward the second position.

In a second aspect of the present invention, a method is provided for equalizing the air pressure between a pair of tires. The method includes determining if the pressure in each tire is above a predetermined minimum, providing airflow between the tires if each tire is above the predetermined minimum, and preventing airflow between the tires if either tire is below the predetermined minimum.

BRIEF DESCRIPTION OF THE DRAWINGS

FIG. 1 is a diagrammatic sectional view of the valve body of the present invention and its inter-connection between a set of dual tires.

BEST MODE FOR CARRYING OUT THE INVENTION

An equalizing valve 2 is attached to an outer rim 3 of a set of dual tires 5 on a load hauling truck. An attachment mechanism for mounting the valve 2 to the outer rim can be any common fastener such as a bolt or a clamp arrangement. Preferably the equalizing valve 2 is located on an outer portion 7 of the outer rim 3 to facilitate easy access to the equalizing valve 2. The equalizing valve 2 connects to a valve stem 11 on the outer rim 3 via a first passageway 18 and to a valve stem 11 on an inner rim 9 via a second passageway 20. The first and second passageways 18,20 may be made of hose, tube, or any other conventional conduit capable of withstanding maximum pressure of the set of dual tires. The first and second passageways 18,20 each preferably include an auxiliary valve stem 15 to allow monitoring or changing the air pressure of each of the first and second tires 22,26). The first and second passageways 18,20 each provide a coupling mechanism 13 to attach to the valve stem of a tire 22,26. The coupling mechanism 13 should be capable of opening and closing a valve in the valve stem of its respective tire.

The equalizing valve 2 of the present invention includes a valve body 4 with a first piston chamber 6 and a second piston chamber 8. Each piston chamber 6,8 may be contained in a single valve body 4 or a pair of valve bodies. Each piston chamber 6,8 has a closed end 10 and an opposite end 12 that is open to atmosphere. Each piston chamber 6,8 has a first inlet port 14 at its closed end 10 and a second outlet port 16 located between the open end 12 and the closed end 10. Each second outlet port 16 is connected to a third passageway 24 which provides fluid communication between each second port 16. The third passageway 24 is sized, preferably by an orifice 38, to restrict the flow of air between the piston chambers 28 and the set of tires 22,26.

A piston 28 is reciprocatably positioned in each piston chamber 6,8 and is moveable between a first position and a second position. The piston 28 may be constructed of metal, plastic, or any other common manufacturing material. The piston 28 may further include a seal to prevent the airflow from the closed end 10 of the piston chamber 6,8, past the piston 28), to the opened end 12 of the piston chamber 6,8.

A biasing member 30 is positioned between the open end 12 of the piston chamber 6,8 and the piston 28 and is responsive to bias the piston 28 toward its first position. The biasing member 30 is preferably a coil spring. Other methods of biasing the piston 28 toward the first end 10 of the piston chamber 6,8 may include, but are not limited to, an air bladder or an elastomeric material. The biasing member 30 is adapted to control the predetermined pressure at which the piston 28 is allowed to open the second outlet port 16 of its respective piston chamber 6. The predetermined pressure at which the second outlet port 16 is open should be above the minimum operating pressure recommended by the tire manufacturer. The predetermined pressure is controlled by the amount of force that the biasing member 30 exerts on the piston 28 in the direction of the closed end 10 of the piston chamber 6. The force to open the second outlet port 16 can be calculated by $(F_b = F_a = P_t * A_p)$ where $F_b$=force of biasing member on piston 28 at the second position, $F_a$ is the total force on the air pressure on the piston 28 opposing $F_b$, $P_t$ is the tire pressure, and $A_p$ is the area of the piston. For instance, if the second inlet port should be open above 90 psi tire pressure and the piston 28 has a surface area of 1½ in.² the force of the biasing member when the piston 28 is open to the second outlet port 16 should be 90 psi * 1½ in.² or 135 lb.

An adjustable base 32 may be placed between the opened end 12 of each piston chamber 6,8 and the biasing member 30. The adjustable base 32 is constructed so as to be movable between a first position, nearest the opened end 12, and a second position, toward the closed end 10. Movement of the adjustable base 32 toward the closed end 10 moves the biasing member 30 toward the closed end to increase the predetermined pressure at which the piston 28 blocks the second outlet port 16 of that pistons 28 respective piston chamber 6 or 8. Alternately, movement of the adjustable base 32 away from the closed end 10 reduces the predetermined pressure at which the piston blocks the second outlet port 16. The adjustable base 32 may be moved via a threaded member 34 (such as a bolt) that extends through from the outside of the second end 12 of the piston cavity 6 or 8. A jam nut 36 is used to lock the threaded member 34 in place. Alternatively, the predetermined pressure at which the piston 28 blocks its respective second port 16 could be adjusted by changing the biasing member 30 to a member with a different rate of compression.

Industrial Applicability

In operation on an load hauling truck, the equalizing valve 2 of the present invention is connected to the first tire 22 by the first passageway 18 and to the second tire 26 by the second passageway 20. If the air pressure in each tire 22,26 is above the predetermined amount, the piston 28 in each valve chamber 6,8 is moved by the air pressure toward the second end 12 of the piston chamber 6 or 8. As the piston 28 moves toward the second end 12, the piston 28 opens the second outlet port 16 of its respective piston chamber 6 or 8. If both pistons 28 have opened the second port 16 of their respective piston chambers 6 or 8, airflow is permitted between the piston chambers 6,8 via the third passageway 24 and first and second tire 22,26 via the first and second passageways 18,20. In case of a sudden loss of pressure in either tire 22,26, the orifice between each outlet port 16 slows the airflow from the between tires 22,26 to allow enough time for the piston 28 associated with the deflating tire to close.

If it is desired to change the predetermined pressure at which the second outlet port 16 is closed, the threaded member 34 can be rotated to move the adjustable base 32. When a spring is used as a biasing member 30, movement of the adjustable base toward the first end 10 of the piston chamber 6 or 8 increases the amount of air pressure required to open the second outlet port 16. Movement of the adjustable base 32 away from the first end 12, decreases the air pressure required to open the second outlet port 16. When the adjustable base 32 is in its desired position the threaded member 34 can be locked in position using a jam nut 36.

It is thus evident that the present invention provides a means to balance the air pressure between a set of dual tires providing that each tire is above a predetermined minimum while preventing a air flow between the tires if either tire falls below the predetermined minimum.

What is claimed is:

1. A pressure equalizing valve for equalizing air pressure between a set of air pressurized dual tires on a load hauling vehicle, comprising:

a first piston chamber having a first inlet port connected in fluid communication with the pressurized air in one tire of said set of tires, a first outlet port and a first piston, said first piston being reciprocatably mounted within said first piston chamber and movable in response to said first inlet air pressure from a first position wherein said piston is adapted to close said first outlet port to said first inlet port to a second position wherein said first piston is adapted to open said first outlet port to said first inlet port;

a second piston chamber having a second inlet port connected in fluid communication with the pressurized air in a second tire of said set of tires, a second outlet port and a second piston, said second piston being reciprocatably mounted within said second piston chamber and movable in response to said second inlet air pressure from a first position wherein said piston is adapted to close said second outlet port to said second inlet port to a second position wherein said second piston is adapted to open said second outlet port to said second inlet port, wherein said second piston is configured to moved independently of said first piston;

a passage communicating said first outlet port of said first piston chamber to said second outlet port of second piston chamber;

a first biasing arrangement operative to overcome said air pressure in said first piston chamber for biasing said first piston to said first position when said air pressure is below a predetermined value; and a second biasing arrangement operative to overcome said air pressure in said second piston chamber for biasing said second piston to said first position when said air pressure is below a predetermined value.

2. The pressure equalizing valve of claim 1, further comprising a coupling for removably connecting a first and a second passageway to its respective tire.

3. The pressure equalizing valve of claim 1, including an adjustable base engaging said biasing arrangement for altering the predetermined pressure at which the respective piston closes the second port of its respective piston chamber.

4. The pressure equalizing valve of claim 1, having an valve stem connected to at least one of said first and second passageways for increasing or decreasing the air pressure of at least one of said set of tires.

5. A method of providing airflow between two tires comprising the steps of;

determining that each tire is above a predetermined air pressure;

providing airflow between said tires if each of said tires is above said predetermined pressure;

determining that either of said tires is below the predetermined pressure; and preventing air flow between said tires if either of said tires is below the predetermined pressure.

6. The method of claim 5, further including the step of restricting the rate of airflow between said tires.

7. The method of claim 5, further including the step of varying the predetermined pressure at which airflow is either permitted or prevented.

8. A pressure equalizing valve for equalizing air pressure between a set of air pressurized dual tires on a load hauling vehicle, comprising:

a first piston chamber having a first inlet port connected in fluid communication with the pressurized air in one tire of said set of tires, a first outlet port and a first piston, said first piston being reciprocatably mounted within said first piston chamber and movable in response to said first inlet air pressure from a first position wherein said piston is adapted to close said first outlet port to said first inlet port to a second position wherein said first piston is adapted to open said first outlet port to said first inlet port;

a second piston chamber having a second inlet port connected in fluid communication with the pressurized air in a second tire of said set of tires, a second outlet port and a second piston, said second piston being reciprocatably mounted within said second piston chamber and movable in response to said second inlet air pressure from a first position wherein said piston is adapted to close said second outlet port to said second inlet port to a second position wherein said second piston is adapted to open said second outlet port to said second inlet port;

a passage commununicating said first outlet port of said first piston chamber to said second outlet port of second piston chamber;

a first biasing arrangement operative to overcome said air pressure in said first piston chamber for biasing said first piston to said first position when said air pressure is below a predetermined value;

a second biasing arrangement operative to overcome said air pressure in said second piston chamber for biasing said first second to said first position when said air pressure is below a predetermined value; and an orifice positioned within said a passageway to slow air movement between said first piston chamber and said second piston chamber in the event of a sudden loss of air in any one of said tires.

* * * * *